United States Patent [19]

Gale

[11] 4,271,907

[45] Jun. 9, 1981

[54] MICROEMULSIONS WHICH COMPATIBLY INCORPORATE VISCOSIFIERS AND THEIR USE IN ENHANCED OIL RECOVERY

[75] Inventor: Walter W. Gale, Houston, Tex.

[73] Assignee: Exxon Production Research Company, Houston, Tex.

[21] Appl. No.: 54,380

[22] Filed: Jul. 2, 1979

[51] Int. Cl.$^3$ .............................................. E21B 43/22
[52] U.S. Cl. .................................... 166/274; 166/275; 252/8.55 D
[58] Field of Search ................. 252/8.55 D; 166/274, 166/275

[56] References Cited

U.S. PATENT DOCUMENTS

| | | | |
|---|---|---|---|
| 3,719,606 | 3/1973 | Froning et al. ....................... 252/308 |
| 3,827,496 | 8/1974 | Schroeder ......................... 166/274 X |
| 3,981,361 | 9/1976 | Healy ............................... 252/8.55 X |
| 4,125,156 | 11/1978 | Gunsmann ....................... 252/8.55 X |

*Primary Examiner*—Herbert B. Guynn
*Attorney, Agent, or Firm*—Michael A. Nametz

[57] ABSTRACT

To improve the sweep efficiency of a microemulsion flooding process to recover crude oil from a subterranean formation, a mobility control polymer is added to the microemulsion to increase its viscosity. To enable the compatible incorporation of the polymer and surfactant into the microemulsion, while still utilizing an aqueous component having a salinity near that of the formation, a microemulsion oil component is used for which the surfactant's optimal salinity is substantially higher than for reservoir crude oil.

11 Claims, No Drawings

MICROEMULSIONS WHICH COMPATIBLY INCORPORATE VISCOSIFIERS AND THEIR USE IN ENHANCED OIL RECOVERY

BACKGROUND OF THE INVENTION

1. Field of the Invention

This invention relates to a process for recovering oil from a subterranean formation by injecting a microemulsion into the formation to displace the oil to a production well. The microemulsion is specially formulated to enable the compatible incorporation of a mobility-control polymer.

2. Description of the Prior Art

The petroleum industry has recognized for many years that only a small fraction of the original oil in place in a reservoir is expelled by natural mechanisms. It is also well known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most economical and widely practiced of secondary recovery methods. In such a process, water is injected through an input well to drive oil from the formation and to an offset producing well. Much of the current work in secondary recovery technology has been directed toward improving the efficiency of waterflooding processes.

Surface active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to sufficiently deform to pass through narrow constrictions in the pore channels. When surface-active agents are added to the flooding water, they lower the interfacial tension between the water, they lower the interfacial tension between the water and the reservoir oil and permit the oil droplets to deform and flow with the flood water. It is generally conceded that the interfacial tension between the flood water and the reservoir oil must be reduced to less than 0.1 dynes/cm. for effective recovery.

While conventional surfactant waterflooding may be effective in obtaining additional oil from subterranean oil reservoirs, it has a number of shortcomings which detract seriously from its value. Foremost among these shortcomings is the tendency of surfactant flood water to finger through the reservoir and to bypass substantial portions of oil. This fingering tendency of a surfactant waterflood is usually explained by the fact that the surfactant flood water has the ability to move through the reservoir at a much faster rate than the oil which it is displacing. The fingering and bypassing tendencies of the surfactant flood water is due in part to its relatively low viscosity.

The mobility ratio of a flooding system is a mathematical relationship that has developed to help explain the behavior of fluids flowing through porous media such as oil reservoirs. When the mobility ratio equation is applied to a "flooding" type operation within a reservoir, it reads as follows:

$$M = \frac{\lambda_w}{\lambda_o} = \frac{k_w/\mu_w}{k_o/\mu_o}$$

where:
  M is the mobility ratio
  $\lambda_o$ is the mobility of the oil in the reservoir
  $\lambda_w$ is the mobility of the driving fluid in the reservoir
  $\mu_o$ is the viscosity of the driven oil
  $\mu_w$ is the viscosity of the driving fluid
  $k_w$ is the relative permeability of the reservoir to the driving fluid in the presence of residual oil
  $k_o$ is the relative permeability of the reservoir to the oil in the presence of residual driving fluid.

This equation is perhaps best explained by stating that when the mobility ratio of the driving fluid to oil is equal to one, the oil and the driving fluid move through the reservoir with equal ease. When the mobility ratio is greater than one, there is a tendency for driving fluid to bypass the oil and finger to the producing well.

It should be noted that crude oils vary greatly in viscosity. Some have viscosities as low as 1 or 2 centipoise and some range up to 1,000 centipoise or greater. Most reservoir oils have a viscosity of up to 10 centipoise at reservoir temperature and pressure. If a surfactant waterflood is conducted using an injection composition where viscosity is approximately 1 centipoise and the oil to be displaced has a viscosity of 10 centipoise, it can be seen from the mobility ratio equation that there will be a tendency for the driving fluid to finger through the reservoir oil. It has in fact been noted that surfactant waterflooding generally performs less satisfactorily with viscous crude oils than with relatively non-viscous oils.

One method for improving conventional surfactant waterflooding techniques is to use microemulsions. Microemulsions are stable, transparent or translucent mixtures of a liquid hydrocarbon, water and a surfactant. Optionally, a co-solvent such as alcohol and electrolytes may be present in the mixture. Generally, microemulsions may be oil-external, water-external or microemulsions wherein no external phase can be identified. In practice, a microemulsion is injected into the formation and displaced through the formation by means of a driving fluid such as thickened water. While the use of microemulsions tends to improve the mobility ratio between it and the reservoir fluids, the problem of fingering and bypassing still occurs.

Several approaches have been suggested to date for improving the mechanics of microemulsion flooding specifically with the view of reducing the degree of fingering and bypassing. The most obvious approach is to increase the viscosity of the microemulsion relative to the oil. A wide variety of materials and formulations have been suggested for accomplishing this purpose. For example, U.S. Pat. No. 3,719,606 to Froning, et al discloses a specially formulated microemulsion containing a sulfonate surfactant, an alcohol co-surfactant, a polysaccharide thickener, an aqueous brine and a hydrocarbon oil. By utilizing closely defined amounts of these materials to prepare the microemulsion substantial improvement in mobility control is claimed. Another example is U.S. Pat. No. 3,827,496 to Schroeder which discloses another special formulation including the incorporation of a viscosity increasing agent within the microemulsion in order to increase microemulsion viscosity. U.S. Pat. No. 3,981,361 to Healy suggests a method for designing a microemulsion system which includes a thickener. These patents are representative of the approaches used and recognized advantages in controlling the mobility of a microemulsion for injection into a formation. Throughout this disclosure, the expressions "polymer" and "thickener" will be used interchangeably to indicate a viscosifying agent which can be added to a liquid to increase the viscosity of the liquid.

Unfortunately, it has been discovered that it is practically impossible to physically dissolve sufficient quantities of polymer into a microemulsion at or near optimal salinity; this problem is particularly acute when this salinity is high, typical of most reservoir brines. The optimal salinity for a given surfactant approximately equals that concentration of inorganic salts in a microemulsion at which a low interfacial tension exists for both a microemulsion-oil interface and a microemulsion-water interface; the expression is defined more precisely in the Definitions section. Many reservoirs contain brines of high salinity, e.g. NaCl concentrations of about 50 g/l or greater up to saturation, $CaCl_2$ concentrations of about 5 g/l or greater up to saturation, $MgCl_2$ concentrations of 5 g/l or greater up to saturation, along with trace amounts of other salts. These high salinities present a particularly severe problem since it is known that the oil recovery tends to be optimized in those cases where the primary surfactant is chosen such that its optimal salinity is close to the salinity of the reservoir in question and where the salinity of the microemulsion is similar to that of reservoir brine. Also, it is highly desirable to inject single-phase microemulsion compositions and, after injection, for such microemulsions to remain as a single phase for as long as possible during movement through the formation.

Various approaches have been taken by others to compatibly incorporate polymer and surfactant into a microemulsion. One approach taken is to add large amounts of costly chemicals to help solubilize the polymer. The economics of this approach often are such that this is not a feasible solution to the problem. Another approach is to utilize a microemulsion system which contains an aqueous component having a reduced salinity with respect to reservoir salinity (i.e. not at optimal salinity). This creates even more problems in that reducing the salinity leads to an increase in oil/microemulsion interfacial tension and hence reduced oil recovery. Finally, even where polymer can be incorporated, phase separation can rapidly occur as the microemulsion flows through the formation resulting in inefficient oil recovery.

It is clear, therefore, that serious and fundamental problems exist with incorporating a viscosity increasing agent into a microemulsion at or near a surfactant's optimal salinity. The crucial and heretofore unsolved problem is to compatibly dissolve sufficient amounts of the thickening agent in the presence of the surfactant. Prior art processes generally require trade-offs between mobility control and interfacial tension reduction. Many of the prior art processes wherein a thickener is suggested to be incorporated into the microemulsion require the use of high amounts of oil or uneconomical amounts of expensive co-solvents and the like to solubilize both surfactant and thickener. In reality, a microemulsion flooding process will not be taken to the field unless the microemulsion uses low amounts of oil and chemicals. In this situation, the approaches of the prior art become inoperable quite simply because sufficient amounts of viscosity increasing agents cannot be dissolved in the microemulsion. For all practical purposes, without the incorporation of such viscosifiers, economic recovery of oil by microemulsion flooding is impossible due to adverse mobilities; similarly, mobility control without sufficient reduction in interfacial tensions is unacceptable.

SUMMARY OF THE INVENTION

This invention relates to a method for recovering oil from an oil-bearing formation which utilizes a single-phase microemulsion specially designed to permit the incorporation of a viscosifying agent without the use of substantial quantities of expensive solubilizing chemicals. In accordance with this invention, a single-phase microemulsion is formulated which comprises an aqueous component having a salinity which is substantially the same as the salinity of formation brine, a surfactant whose optimal salinity (as defined below) with respect to the crude oil in the formation is substantially the same as the formation salinity, an oil component for which the surfactant's optimal salinity is substantially higher than the formation salinity and a viscosity increasing agent, most typically a polymeric material such as a heteropolysaccharide or polyacrylamide. More specifically, the microemulsion parameters are determined using formation crude oil as the oil component, but the oil actually used in formulating the microemulsion is one having a substantially high equivalent alkane carbon number than that of the crude oil. This surprisingly permits the incorporation of a polymer and results in a single-phase microemulsion which has both excellent interfacial tension reducing properties and is sufficiently viscous for good sweep efficiency. The thickened, low oil content microemulsion is injected into the formation to displace reservoir oil to a production means with significantly increased sweep efficiency due to a reduction in fingering and bypassing.

DETAILED DESCRIPTION OF THE INVENTION

Definitions

Before discussing the invention in detail, several concepts often used in microemulsion technology should be defined.

Several different types of "optimal salinity" are discussed in the literature. Among them are optimal salinity for phase behavior, interfacial tension, and oil recovery. Fortunately, the magnitudes of these salinities are approximately the same. (See, e.g., R. N. Healy and R. L. Reed, "Immiscible Microemulsion Flooding", *Society of Petroleum Engineers Journal*, pp 129-139 (1977)). For the purposes of this patent, the expression "optimal salinity" shall mean optimal salinity for phase behavior (unless otherwise noted). Further, it is assumed that the optimal salinity for oil recovery and for phase behavior are substantially the same.

As mentioned, a microemulsion is formulated by combining an aqueous phase (brine), an oil, and a surfactant. Optimal salinity for phase behavior ($C_\phi$) is that salinity of an aqueous phase at which the volume ratio of oil to surfactant ($V_o/V_s$) and volume ratio of the aqueous phase to surfactant ($V_w/V_s$) in the resulting microemulsion phase are equal for systems in which the resulting microemulsion is saturated with both oil and aqueous phase. The optimal salinity for phase behavior depends on the oil, surfactant, surfactant concentration, and temperature as well. It has been establishes that $V_o/V_s$ is an increasing function of salinity, whereas $V_w/V_s$ is a decreasing function of salinity. The intersection of these functions is termed optimal salinity for phase behavior ($C_\phi$).

The magnitudes of both $V_o/V_s$ and $V_w/V_s$ are important since they are not only related to interfacial tension values, but also relate directly to the ease with which low-oil-content injection compositions can be formulated. For example, ultra-low interfacial tensions are observed at solubilization parameters ($V_o/V_s$ and $V_w/V_s$) of 10 or more. Moreover, a solubilization parameter at optimal salinity as high as 20 is exceedingly rare. In the absence of any alcohol partitioning effects or any effects which cause optimal salinity to be dependent on surfactant concentration, low-oil-content compositions cannot be formulated at optimal salinity without using high surfactant concentrations (>5%) or high oil contents (>15%). (All percentages are volume percent unless otherwise noted.) For example, a typical injection composition might contain 3% surfactant, 5% oil, and 92% water having a salinity equal to $C_\phi$. For these components to exist in a single phase, $V_o/V_s$ would have to be equal to or greater than 5/3, or 1.7, and $V_w/V_s$ would have to be equal to or greater than 92/3, or 30.7. The significance of this is that since, at optimal salinity, $V_w/V_s$ values as high as 20 are exceedingly rare, the above typical prior art composition would result in a microemulsion plus an excess brine phase (not a single-phase composition). Further, it has been discovered that where a separate brine phase forms, the polymer molecules exist almost entirely in this excess brine phase. This is one major reason why prior art processes fail in the field.

The expression "equivalent alkane carbon number" (EACN) as used herein is defined as a mole-weighted average of the number of alkane carbons for a mixture of hydrocarbons. For example, in a mixture consisting of 25 mole-percent hexane (C=6), 25 mole percent octane (C=8) and 50 mole percent decane (C=10), the EACN would equal 0.25(6)+0.25(8)+0.5(10)=8.5.

The EACN of a hydrocarbon mixture is useful in making comparisons between various crude oils (which are extremely complex mixtures of hydrocarbons) and simple hydrocarbon mixtures. This also permits the use of readily available hydrocarbons in place of crude oils in experimentally evaluating surfactant systems.

In relating the EACN of a simple hydrocarbon mixture to a complex hydrocarbon mixture of a crude oil, the approach taken in the literature requires a comparison of interfacial tension values. Specifically, for a given surfactant species and concentration, and water/crude oil ratio, there will exist a minimum oil-water interfacial tension; the same minimum will exist for some simple hydrocarbon mixture having a known EACN. Therefore, the EACN of the crude oil is set equal to that of the known EACN. This approach was initially proposed in the following papers: J. L. Cayias, R. S. Schechter, W. H. Wade, "Modeling Crude Oils for Low Interfacial Tension", *Society of Petroleum Engineers Journal*, December 1976, pages 351-357; and L. Cash, J. L. Cayias, G. Fournier, D. Macallister, T. Schares, R. S. Schechter, W. H. Wade, "The Application of Low Interfacial Tension Scaling Rules to Binary Hydrocarbon Mixtures", *Journal of Colloid and Interface Science*, Vol. 59, No. 1, March 1977, pages 39-44.

Their approach, as developed in the literature, utilizes special mixing rules which modify the resulting EACN value for the crude oil somewhat. These special rules take into account the presence of crude oil of, for example, saturated ring hydrocarbons.

Another approach used to relate crude oil to simple hydrocarbon mixtures is to compare phase behaviors, and this is the approach taken herein. Specifically, for a given surfactant species and concentration, and water/crude oil ratio, there will exist an optimal salinity for phase behavior; the same optimal salinity will exist for some simple hydrocarbon mixture having a known EACN. As before, the EACN of the crude oil is set equal to that of the known EACN.

Crude oil EACN values determined by these two approaches are slightly different due to the differing approaches. However, values calculated according to the approach taken herein are close to those of the literature and providing definitional simplicity.

Detailed Description

The crux of this invention is the discovery that single-phase microemulsions for enhanced oil recovery operations can be formulated which compatibly incorporate at or near optimal salinity: (1) sufficient quantities of surfactant to give good reduction in oil-microemulsion and water-microemulsion interfacial tensions; (2) sufficient quantities of a viscosifying agent to give good mobility control. This is accomplished by changing the oil component of the microemulsion from one which approximates the chemical and physical characteristics of the reservoir crude oil in question (as with prior art processes) to one having different characteristics. Namely, these superior microemulsions are achieved by using an oil component whose equivalent alkane carbon number (EACN) is higher than that of the crude oil.

As mentioned previously, microemulsions are generally designed using surfactants which have an optimal salinity close to the salinity of the reservoir to be flooded. This gives the most compatible system and tends to prevent detrimental phase changes within the reservoir upon the inevitable mixing of the various fluids (with other injected fluids or with in-place fluids). This patent discloses the use of an oil component in a low-oil-content injection composition for which the solubilization parameter for water, $V_w/V_s$, is greatly enhanced. Such an oil component would have an equivalent alkane carbon number (EACN) higher than reservoir crude oil. Reservoir crude oil, however, is the oil used to select the surfactant component with an optimal salinity substantially equal to the salinity of reservoir brine. One result of using such an oil component is that a single phase microemulsion containing polymer, surfactant, oil, and brine (whose salinity is optimal for reservoir crude) can be formulated with little sacrifice in either economy (co-surfactant additives or high oil contents are in general unnecessary), level of interfacial tension reduction (due to lowering salinity of injection composition below optimal salinity for reservoir crude), or risk occurred by using small banks for high surfactant content microemulsion (small banks being necessitated simply because of economics).

The microemulsion for use in a specific application is designed by first determining information concerning the oil-bearing formation from which oil is to be recovered. The oil from the formation is analyzed to determine its physical and chemical characteristics. Similarly, water from the formation is analyzed to determine the quantity and type of ionic substances present, i.e. the reservoir salinity is determined. The formation temperature is also determined by conventional means.

Screening studies are then performed in order to roughly characterize those microemulsion systems which may have utility in the particular formation. A detailed description of suitable screening methods is provided in U.S. Pat. No. 3,981,361 which issued to R. N. Healy on Sept. 21, 1976. According to this methodology, microemulsions are formulated on the basis of the information obtained from the subterranean formation. In performing the screening studies, an oil from the formation or one having similar physical and chemical characteristics is used. Also, formation water or an aqueous medium having a similar salinity is also employed. As a matter of convenience in the initial screening, these fluids are used in substantially equal volume. Moreover, the screening studies generally will not include additives commonly employed in field practice, including the additive involved in the present invention—a viscosifying agent. On the contrary, these screening studies generally contain oil, water and surfactant only.

As the next step in the screening studies, a surfactant is added to the oil and water to form a microemulsion. Any of the surfactants conventionally employed in surfactant flooding or microemulsion flooding can be utilized in the method of the present invention. For example, the surfactants applicable in accordance with the present invention can be any of those which are described in the following nonlimiting list of U.S. Pat. Nos.: 3,254,714; 3,301,325; 3,330,344; 3,368,621; 3,455,386; 3,348,611; 3,455,385; 3,455,389; 3,453,635; 3,443,636; 3,406,754; 3,261,399; 3,297,985; 3,480,080; 3,478,823; 3,477,511; and 3,469,630. Also, the surfactants of U.S. patent application No. 870,313 filed on Jan. 18, 1978 entitled "Propoxylated Ethoxylated Surfactants and Method of Recovering Oil Therewith" find particular utility in the method of the present invention.

The surfactants utilized in the microemulsions of the present invention can be anionic, nonionic or cationic in character with particularly applicable surfactants being petroleum and synthetic sulfonates as well as polyoxyalkylated organic materials and sulfates thereof. Anionic sulfonate surfactants can be illustrated by metal or ammonium salts of sulfonate surfactants, e.g., alkali metal or ammonium salts of sulfonated petroleum hydrocarbons such as alkylated napthalene sulfonates, alkylated benzene sulfonates; or the sulfocarboxylate salts; and the like. Exemplary sulfonates are the alkali metal (Na, K, Li) or ammonium salts of petroleum sulfonates such as $C_{15-30}$ alkyl aryl sulfonates, alkylated benzene sulfonates, and the like. Materials of this type are sold commercially under various trade names such as petroleum sulfonates sold by the Bray Chemical Company or the Bryton Chemical Company as Bryton Sulfonate, F, 430, 467, 500; or the Sonneborn Chemical Company as Petronates; or Mobil Oil Company as "Promor" sulfonates of the SS-6, SS-20 series; American Cyanamid's "Aerosol OT" which is sodium dioctyl sulfosuccinate; and the like. A suitable sulfonate mixture is a sodium salt of a petroleum sulfonate in the molecular weight range of 350–420 and a sodium salt of a petroleum sulfonate in the molecular weight range of 420–580, or a sodium salt of a mixture of petroleum sulfonates having an average molecular weight in the order of about 430–470 and mixtures of such sulfonates from the above low and high molecular weights, and other salts of such petroleum sulfonates.

Particularly applicable sulfonate surfactants utilized in the method of the present invention are the synthetic sulfonates which can be generically described as $C_{6-18}$ orthoxylene or toluene sulfonates wherein the salt-forming cation is selected from alkali metals, ammonium, and amines such as $C_{1-4}$ mono-, di-, and tri-alkanol amines, an example being monoethanolamine. A particularly applicable surfactant showing excellent characteristics in the environment of the present invention is a monoethanolamine $C_{12}$ orthoxylene sulfonate, i.e. an orthoxylene sulfonate containing a carbon chain predominating in $C_{12}$.

Preferred sulfated polyoxyalkylated surfactants comprise ethoxylated alcoholic compounds such as oxyalkylated alkanols which can be represented by the formula $RO(C_2H_4O)_{2-10}$—H; where R is an alkyl radical of 10–15 carbon atoms, the alcohol used in the ethoxylation being a mixture of alcohols of 10–15 carbon atoms.

Sulfates of ethoxylated primary alcohols are commercially available from Shell Chemical Company under the trade name Neodol 23-23A having the formula $C_{12-13}O(CH_2CH_2O)_3SO_3NH_4$ and Neodol 25-3S of the formula $C_{12-15}O(CH_2CH_2O)_3SO_3Na$.

Other anionic sulfated ethoxylated alcohols are available from Union Carbide under the trade name Tergitol S such as Tergitol Anionic 14S-3A (ammonium salt) or 15-S-3.0 (sodium salt).

The microemulsions of this invention will also contain additional electrolytes in order to give a microemulsion system whose aqueous component has a salinity which is similar to the salinity of the reservoir brine. This may require the addition of electrolytes such as sodium chloride and other alkali metal or ammonium salts of anions such as chlorides, sulfates, nitrates, carbonates, phosphates, or the like and mixtures thereof in order to result in an aqueous component having a composition similar to that of the reservoir brine. The microemulsion useful in the method of the present invention may additionally contain one or more cosurfactants or solubilizers to adjust the brine tolerance of the surfactant; however, such use is optional and does not form the basis for this invention. Typical examples of such cosurfactants include alcohols, amides, amino compounds, esters, aldehydes and ketones containing one to about twenty or more carbon atoms. Additional suitable examples are mentioned in U.S. Pat. No. 3,981,361, cited previously.

As mentioned, all of the screening studies performed according to the principles of U.S. Pat. No. 3,981,361 are done using an oil which approximates the composition of the reservoir crude oil. In determining the microemulsion system that will be used in the field, a governing principle is that the salinity of the aqueous component of the microemulsion should be substantially similar to the salinity of the reservoir brine. Thus, a surfactant must be chosen which has an optimal salinity ($C_\phi$) which approximates the reservoir salinity. This will give an optimum balance of acceptably low interfacial tensions between crude oil, microemulsion and water. Balance, low interfacial tensions are important since this means that on the one hand, the microemulsion can effectively displace crude oil from the formation and, on the other hand, the microemulsion itself can be displaced by a driving fluid, e.g. thickened water.

At this point, following the teachings of the prior art, a microemulsion system ostensibly suitable for injection into a formation would emerge. However, following prior art teachings, it is difficult if not impossible to economically incorporate a viscosifying agent into the microemulsion at optimal salinity in order to promote good sweep efficiencies. The method of the present invention permits compatible incorporation of surfactant and polymer by adjusting the oil component in the microemulsion.

In essence, a microemulsion is created using an oil component for which the chosen surfactant's optimal salinity is substantially higher than the reservoir salinity. By utilizing this critical design feature, it has been surprisingly discovered that surfactant and sufficient amounts of polymer can be incorporated into a single phase microemulsion which contains an aqueous component which has a salinity approximating that of reservoir brine. A significant feature of this invention is that lower quantities of oil component are required to prepare a single-phase microemulsion having sufficiently increased viscosity for good mobility control. Thus, typical microemulsion compositions will contain from about 75 to about 98 volume % brine, from about 1 to about 10 volume % surfactant, from about 200 to about 5000 ppm thickener and from about 1 to about 15 volume percent oil.

The key is that the oil component used in the microemulsion is characterized by an equivalent alkane carbon number which is substantially higher than the equivalent alkane carbon number of the crude oil in the formation. In practicing this invention, the EACN of the microemulsion oil component will preferably be from about 25% to about 300%, most preferably about 50% to about 150%, higher than the EACN of the formation crude oil.

Typical EACN values for formation crudes have been reported in the previously cited article by J. L. Cayias, et al and are shown in the following Table I:

TABLE I

| EACN for Several Crude Oils | |
|---|---|
| Crude Oil | EACN |
| Big Muddy Field | 8.5 |
| Bradford Field | 8.6 |
| Delaware Childers Field | 7.7 |
| Horseshoe Gally Field | 8.2 |
| Prudhoe Bay Field | 6.2 |
| Salt Creek Field | 7.8 |
| Wasson Field | 7.4 |
| West Ranch Field | 6.6 |

These values were established by Cayias, et al using the interfacial tension comparison approach mentioned previously; however, corresponding values obtained according to the phase behavior comparison approach would deviate no more than ±10%. By experimentation and using the phase behavior definition set forth herein, Loudon Field crude oil has been found to have an EACN of about 7.5.

Practically speaking, most crude oils will have an EACN (however determined) of between about 6 and about 9; therefore, in practicing this invention, most oils used in the microemulsion will have an EACN of from about 7.5 to about 27.

In practicing this invention in the Loudon Field, a superior microemulsion composition can be prepared using about 3 volume percent of an oil component having an EACN of about 12, which enables incorporation of sufficient amounts of surfactant and viscosifier at optimal salinity (e.g. 91 g/l NaCl and 10 g/l $MgCl_2.6H_2O$ and 8 g/l $CaCl_2$). Thus, for this superior microemulsion, the EACN of the oil component is about 60% higher than that of the Loudon crude oil.

Suitable thickeners for use in adjusting the viscosity of the microemulsion comprise water-soluble polymeric materials such as carboxymethyl cellulose, polyethylene oxide, high molecular weight salts of polymers containing amide and carboxylic groups produced by polymerizing acrylamide or its homolog such as methacrylamide and partially hydrolyzing the amide groups and the like. These include high molecular weight polyelectrolyte polymers such as partially hydrolyzed polyacrylamides sold, for example, under such tradenames as "Pusher" from Dow Chemical Company. An additional and especially preferred class of polymers suitable as thickeners and mobility control agents are the bipolymers or polysaccharides such as "Kelzan XC" available from the Kelco Division of Merck and Company, and Pfizer 1035.

If desired, a bank of thickened or unthickened water may be injected before injecting the microemulsion, i.e., a preflush solution may be injected. This is sometimes utilized in order to change the salinity of the aqueous fluids in a formation thereby assuring that the microemulsion does not contact water in the formation which may be deleterious to the microemulsion system. However, it should be emphasized that the present invention does not depend on the use of such a preflush. Nevertheless, a preslug of an appropriately formulated brine tends to inhibit degradation of the microemulsion by divalent cations in the formation by displacing and exchanging the divalent cations ahead of the microemulsion. See, for example, U.S. Pat. No. 4,074,755 (Hill, et al) which issued on Feb. 21, 1978.

Generally, the microemulsion slugs injected into the subterranean formation in accordance with the present invention are slugs of from about 0.02 to 2 PV, preferably 0.05 to 0.5 PV. For purposes of economics, it is preferred, in accordance with the present invention, to minimize to injection of the microemulsion slug and it is preferred to inject such microemulsion slug in an amount of about 0.02 to 0.2 PV.

Following injection of the thickened microemulsion prepared in accordance with this invention, thickened water is preferably injected into the formation to displace injected microemulsion through the formation to one or more production wells. The thickened water may comprise ordinary water or brine containing one or more conventionally employed thickeners. Suitable thickeners include the conventional thickeners discussed above for use in the microemulsion. The salinity of the brine may be adjusted to give desirable phase behavior and improved oil recovery.

EXAMPLE I

In the Loudon Field, Illinois, it is known that the optimal salinity of the microemulsion ultimately injected should be near that of Tar Springs Brine to provide low oil-microemulsion and low water-microemulsion interfacial tensions to obtain acceptable economic oil displacement efficiency. Optimal drive water should also be as near to Tar Spring Brine as possible so that problems due to reservoir mixing (e.g. phase separation, precipitation, etc.) will be minimal. The composition of Tar Springs Brine is given in Table II:

TABLE II
Composition of Tar Springs Brine

| Component | Concentration (g/l.) |
|---|---|
| NaCl | 91.71 |
| $CaCl_2$ | 7.86 |
| $MgCl_2 \cdot 6H_2O$ | 10.33 |
| $BaCl_2 \cdot 2H_2O$ | 0.133 |
| $NaHCO_3$ | 0.195 |

Good mobility control throughout the flood and no deterioration of oil recovery with length are also key criteria, and hence a viscosity increasing agent will be necessary.

Utilizing the methods of previously mentioned U.S. Pat. No. 3,981,361 to conduct screening studies, a surfactant was chosen which best met all the criteria; the chosen surfactant PL-476 was an alkoxylated sulfated primary alcohol. This surfactant has an optimal salinity which is approximately the same as Tar Springs Brine for Loudon crude oil and at 90° F. (which is the temperature of a portion of the Loudon reservoir).

Berea sandstone core floods conducted with this surfactant in a microemulsion using an oil component having similar physical and chemical characteristics to Loudon crude oil (EACN=7.5) lacked good mobility control between the microemulsion bank, the drive water bank and the flowing oil-water bank. Thus, in order to improve the mobility ratio between the injected slug and the flowing water-oil bank, it was decided to add a polysaccharide thickener to the microemulsion. Addition of the chosen polymer caused the microemulsion to separate into an upper phase microemulsion and an excess lower water phase containing predominantly polymer. This presented a completely unacceptable system for injection into a formation.

According to the method of the present invention, the composition of the oil component was changed from an oil of similar composition to Loudon crude to dodecane ($C_{12}H_{26}$; EACN=12). Dodecane was chosen by systematic study of the phase behavior of PL-476 surfactant-polymer-oil-Tar Springs Brine systems where the oil component was varied in one or two carbon increments and other variables were held constant. Dodecane was established to be the lowest carbon-number hydrocarbon which provided a single phase microemulsion with PL-476 surfactant in Tar Springs Brine (which is the desired salinity of the microemulsion for injection into the formation). A microemulsion for injection having the composition of 2.5% PL-476 surfactant, approximately 3% dodecane, 400 parts per million of a heteropolysaccharide (Pfizer 1035) in Tar Springs Brine was developed. This single phase microemulsion had a viscosity of near 15 centipoise at 11.5 sec$^{-1}$ shear rate at 90° F. The drive water contained 750 parts per million Pfizer 1035.

The performance of this microemulsion in core flooding was compared with that of a microemulsion prepared without Pfizer 1035 and containing 2% of an oil component similar to Loudon crude. The core flooding procedures are more completely described in U.S. Pat. No. 3,981,361 and need not be repeated here. A 0.2 pore volume (PV) microemulsion bank formulated according to this invention gave an $S_{of}$ of 8.6% after 1.2 PV of liquids had been produced, while the microemulsion which was not thickened but which contained the supposed optimum oil component gave an $S_{of}$ of 10.3% after about 1.4 PV of production. This and other floods using 2-foot Berea sandstone cores confirmed that the oil displacement efficiency was significantly enhanced by the use of the microemulsion in which polymer had been compatibly incorporated.

EXAMPLE II

Based on excellent flood results obtained in Example I in 2-foot cores, a 16-foot core test was run in which a 20.8% pore volume bank of 2.5% of PL-476 surfactant, 3% dodecane, and 400 parts per million Pfizer 1035 heteropolysaccharide in Tar Springs Brine was injected into a 16-foot long Berea sandstone core containing Tar Springs Brine and residual Loudon Field crude oil. The entire flood was conducted at approximately one foot/day at 90° F. The microemulsion bank was driven with approximately a 40% pore volume bank of 930 parts per million Pfizer 1035 in 70% Tar Springs Brine. Four pressure taps were provided along the length of the core to permit the determination of pressure gradients. The results of this core flood were excellent. Oil recovery was high. Approximately 78% of the waterflood residual Loudon crude oil was recovered by 1.2 pore volumes, leaving an oil saturation of only 7.8% after accounting for injected oil (contained in the microemulsion phase). Moreover, pressure tap measurements made along the core during flooding indicated that good sweep efficiencies would be expected in the field. To emphasize, ability to compatibly incorporate a polymer into the microemulsion has critical importance in taking the process to the field.

The principle of the invention and the best mode contemplated for applying that principle have been described. It is to be understood that the foregoing is illustrative only and that other means and techniques can be employed without departing from the true scope of the invention defined in the following claims.

What I claim is:

1. A method for recovering crude oil having a characteristic equivalent alkane carbon number from a subterranean formation which also contains brine having a known salinity which comprises:
   (a) formulating a single-phase microemulsion which comprises an aqueous component having a salinity which is substantially the sme as said known salinity, a surfactant whose optimal salinity with respect to said crude oil is substantially the same as said known salinity, an oil component for which the surfactant's optimal salinity is substantially higher than said known salinity and having an equivalent alkane carbon number which is from about 25% to about 300% greater than that of said crude oil, and a water soluble polymeric viscosity-increasing agent; and
   (b) injecting said microemulsion into said subterranean formation to recover crude oil.

2. The method of claim 1 wherein said viscosity-increasing agent is a polysaccharide.

3. The method of claim 1 wherein said viscosity increasing agent is a polyacrylamide.

4. The method of claim 1 which includes preflushing and formation with an aqueous salt solution to result in said known salinity.

5. The method of claim 1 wherein the viscosity of said microemulsion is greater than the viscosity of said crude oil at reservoir conditions.

6. A process for enhanced recovery of crude oil having a characteristic equivalent alkane carbon number from a subterranean reservoir containing a brine of known salinity which comprises:

(a) forming a single-phase microemulsion by combining an aqueous medium having a salinity approximately the same as said known salinity, a surfactant having an optimal salinity with respect to said crude oil which is approximately the same as said known salinity, an oil having an equivalent alkane carbon number which is from about 25% to about 300% higher than that of said crude oil, and a water soluble polymeric thickener;

(b) injecting said microemulsion into said reservoir to recover oil.

7. The process of claim 6 wherein said oil used to formulate the microemulsion comprises a mixture of hydrocarbons.

8. The process of claim 6 wherein said surfactant is a sulfated or sulfonated polyalkoxylated alcohol containing 8-20 carbon atoms.

9. The process of claim 6 wherein said surfactant is a toluene or orthoxylene sulfonate.

10. The process of claim 6 wherein said thickener is a polysaccharide or a polyacrylamide.

11. A method for recovering crude oil from a reservoir containing a brine of known salinity and a crude oil having a known equivalent alkane carbon number which comprises (a) preparing a low oil content, single-phase microemulsion by combining an aqueous salt solution having substantially the same salinity as said known salinity, a surfactant having an optimal salinity substantially the same as said known salinity, an oil having an equivalent alkane carbon number which is from about 25% to about 300% greater than said known equivalent alkane carbon number, and a water soluble polymeric thickening agent;

(b) injecting said microemulsion into said formation via an injection well;

(c) displacing said microemulsion and consequently said crude oil with a thickened aqueous liquid to a production well; and (d) producing said crude oil.

* * * * *

UNITED STATES PATENT AND TRADEMARK OFFICE
CERTIFICATE OF CORRECTION

PATENT NO. : 4,271,907
DATED : June 9, 1981
INVENTOR(S) : Walter W. Gale, Houston, Texas It is certified that error appears in the above—identified patent and that said Letters Patent is hereby corrected as shown below:

Column 5, line 3, "establishes" should read --established--

Column 6, line 19, "providing" should read --provide--

Column 12, line 44 for the Claim 1, "sme" should read --same--

Signed and Sealed this

First Day of December 1981

[SEAL]

Attest:

GERALD J. MOSSINGHOFF

*Attesting Officer*     *Commissioner of Patents and Trademarks*